Nov. 12, 1940.  C. H. GAY  2,220,899
BRANCH CONNECTION
Original Filed June 23, 1934  4 Sheets-Sheet 1

INVENTOR
Cecil H. Gay
BY
ATTORNEY

Nov. 12, 1940.   C. H. GAY   2,220,899
BRANCH CONNECTION
Original Filed June 23, 1934   4 Sheets-Sheet 2
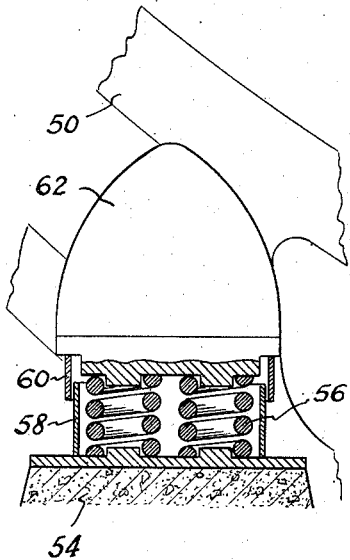
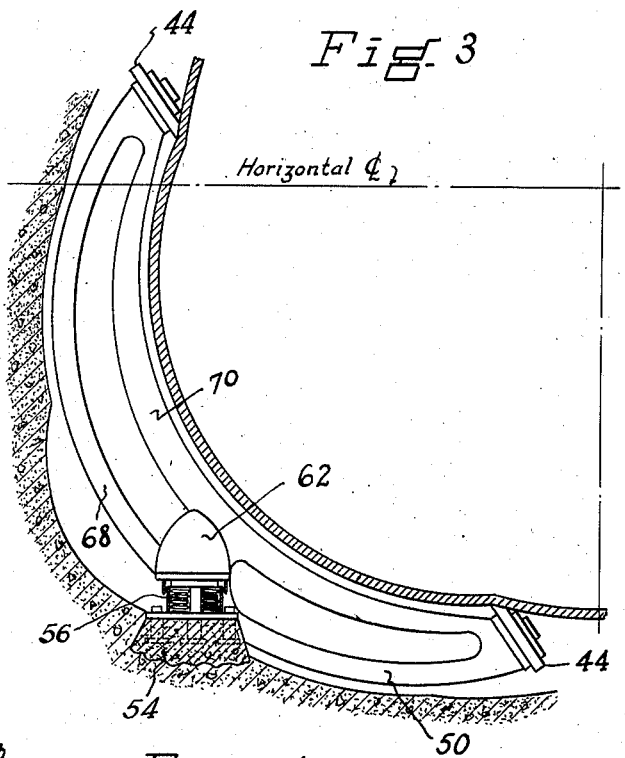
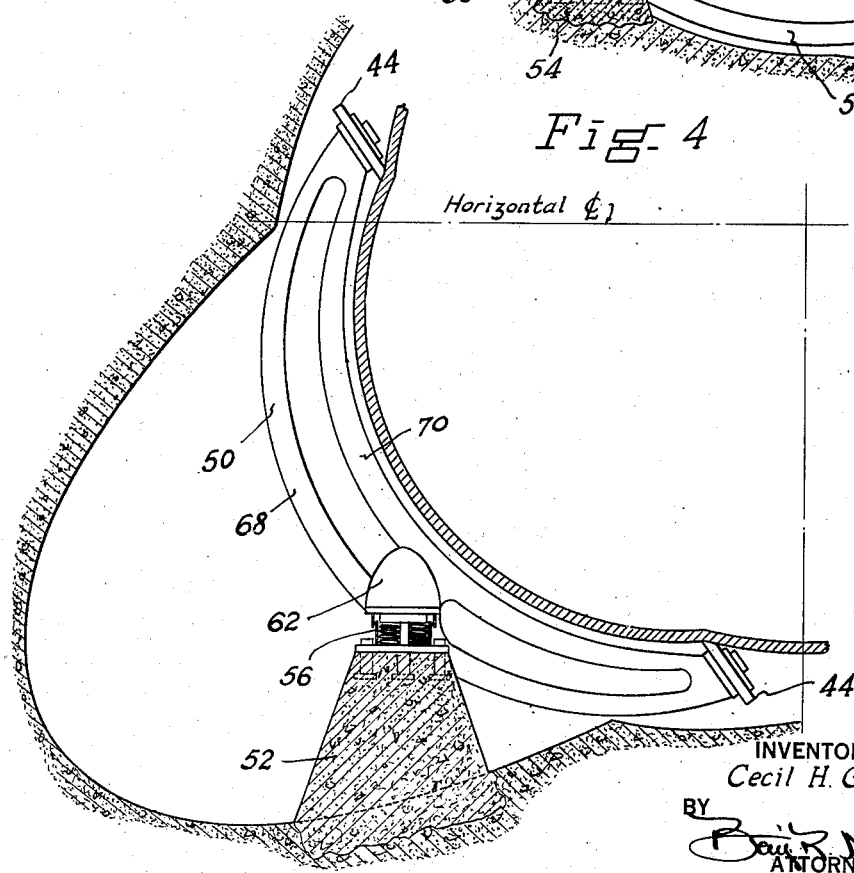
INVENTOR
Cecil H. Gay
BY
ATTORNEY Nov. 12, 1940.  C. H. GAY  2,220,899
BRANCH CONNECTION
Original Filed June 23, 1934   4 Sheets-Sheet 3
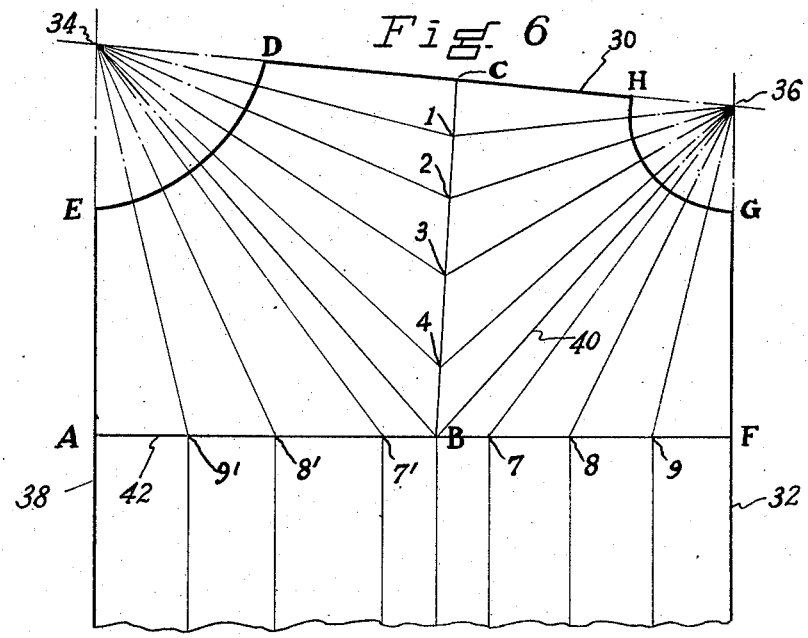
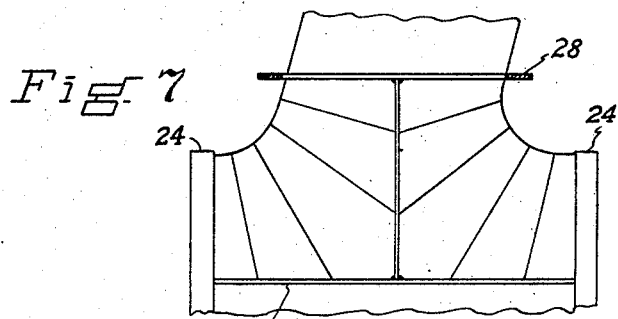
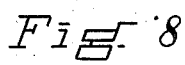
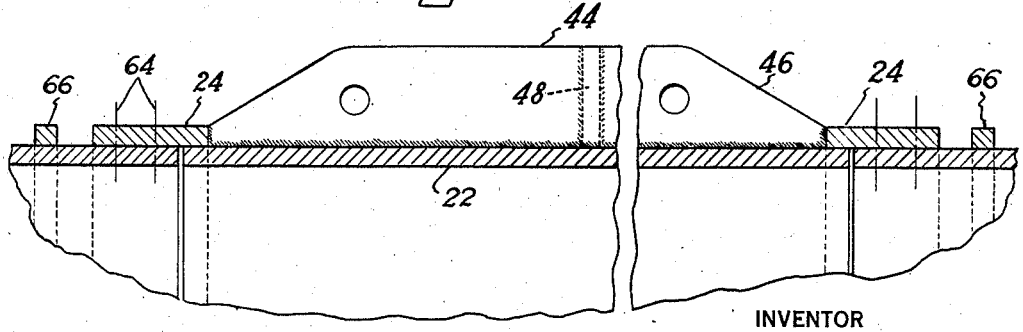
INVENTOR
Cecil H. Gay
BY
ATTORNEY Nov. 12, 1940.  C. H. GAY  2,220,899
BRANCH CONNECTION
Original Filed June 23, 1934  4 Sheets-Sheet 4
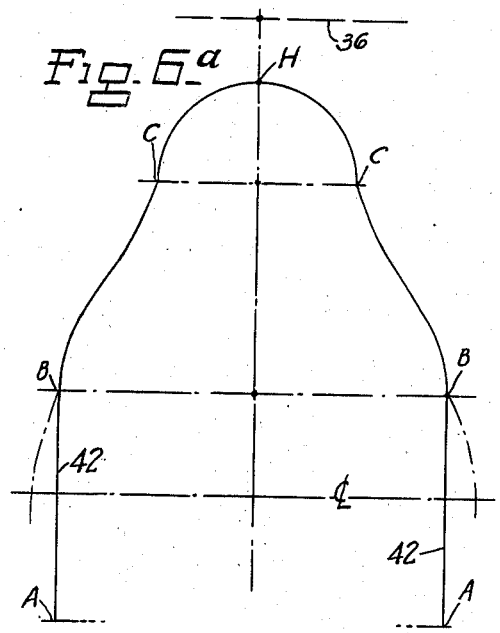
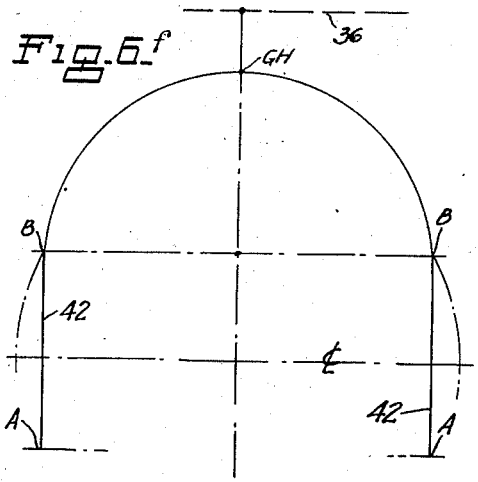
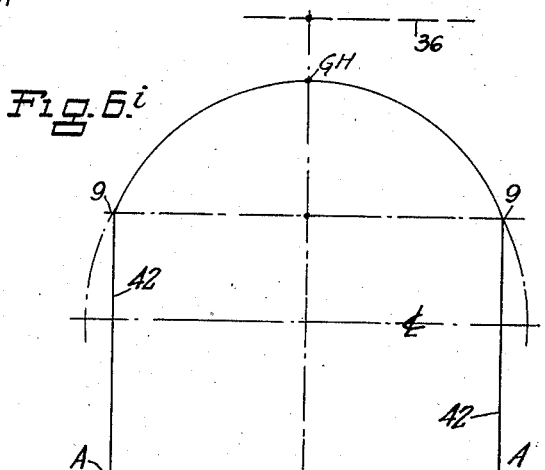
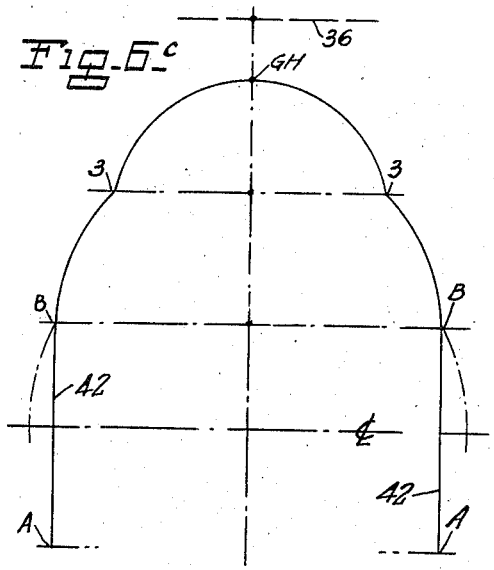
Inventor
Cecil H. Gay
By
Attorney Patented Nov. 12, 1940

2,220,899

UNITED STATES PATENT OFFICE 2,220,899

BRANCH CONNECTION

Cecil H. Gay, Akron, Ohio, assignor to The Babcock & Wilcox Company, Newark, N. J., a corporation of New Jersey Application June 23, 1934, Serial No. 732,021
Renewed June 13, 1939

13 Claims. (Cl. 285—106)

This invention is concerned with hydraulics, and more particularly with improvements in heavy metallic penstock conduits which are subjected to fluid pressures of high order.

It is an object of the invention to provide, in large diameter and high pressure penstocks, branch connections which will resist the unbalanced forces existing on account of the necessary discontinuity of pressure circles of the main conduit at its juncture with a penstock branch, and simultaneously provide for a flexibility in the branch structure which will not subject any part to excessive strains under normal radial expansion due to fluid pressures.

In the manufacture of large diameter conduits to withstand high fluid pressures there have been attempts to form branch connections made up of forged steel plates joined at their edges by welding. Repeated experiments in connection with the building of such structures have indicated that it is exceedingly difficult to produce such a structure of adequate strength which will be sufficiently flexible at all points to keep stresses within the structure within an allowable range and also will be an inherently sound structure subject to relatively definite determination of the weld characteristics after fabrication. Such attempts have also indicated an excessively high manufacturing cost because of a lack of adequate co-ordination of the parts. It is a further object of the invention to overcome these difficulties and simultaneously provide a branch connection in which the pressure stresses are carried as direct stresses only, with no bending.

It is also an object of the invention to provide a penstock branch outlet including structures arranged to concentrate all forces other than direct tension stresses due to internal pressure, on lines on the sides of the main conduit and parallel to its longitudinal axis, and on lines preferably substantially parallel to the axis of the branch.

It is also the object of the invention to provide for penstock conduits and the like a branch connection in which there will be a minimum of obstruction or resistance to fluid flow and a minimum weight of material. The latter factor is of considerable importance in the construction of large diameter conduit branch connections where the ratio of internal diameter to the wall thickness is large.

Other objects will appear as the description of the invention proceeds, but it is to be understood that the illustrative embodiment of the invention is particularly applicable to metallic hydraulic conduits of large diameters and subjected to high fluid pressures.

The invention will be described with reference to the accompanying drawings, in which:

Fig. 3 is a section taken on the line 3—3 of Fig. 1.

Fig. 4 is a section on the line 4—4 of Fig. 1.

Fig. 5 is a detail view showing the spring mounting for the curved beams truss members.

Fig. 6 is the diagrammatic view in the nature of a plan of the branch connection illustrating characteristics of the warped surface of the connection.

Figure 1:
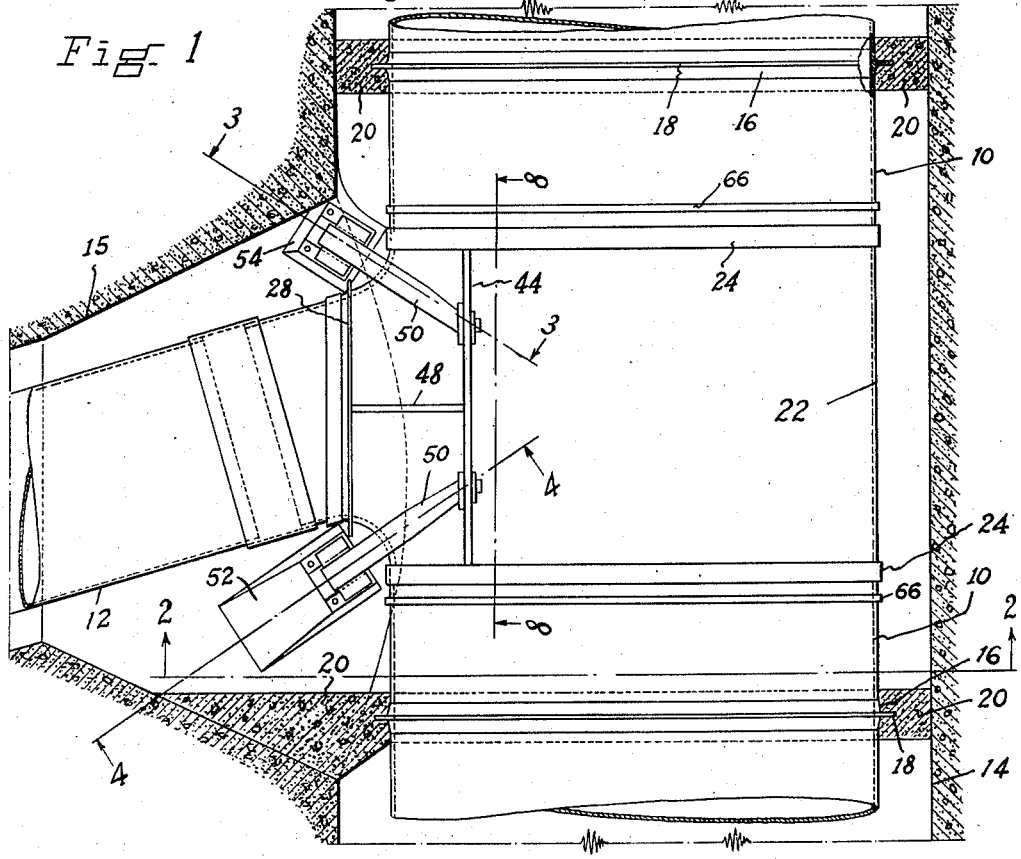
Fig. 1 is a view in the nature of a plan, showing a section of a main conduit having a branch penstock connection which is of smaller diameter.
Figure 2:
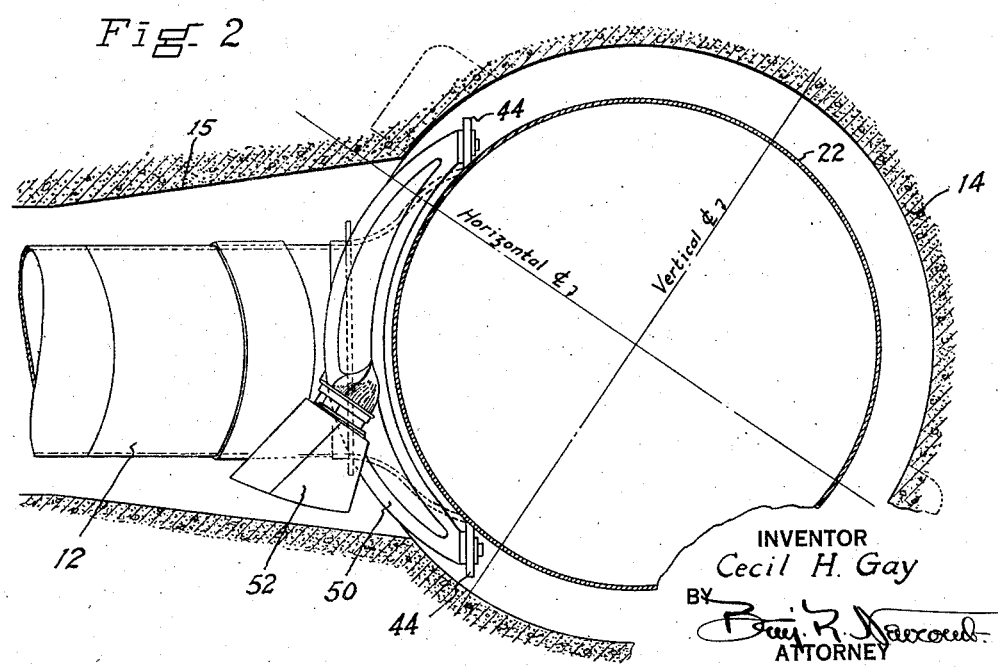
Fig. 2 is a view taken along the line 2—2, thus depicting the branch in elevation and the main conduit in section, and partly in section on the line 2—2 of Fig. 1.

Figs. 6$^a$, 6$^c$, 6$^f$ and 6$^i$ are diagrammatic cross-sectional delineations of the different sections as shown in Fig. 6 on the planes indicated by corresponding letters.

Fig. 7 is a diagrammatic view indicating an arrangement wherein the opposing parts of the warped surface junction section intersect in a straight line normal to longitudinal axis of the main conduit.

Fig. 8 is a view showing one of the main pressure beams in elevation.

In the drawings there is shown a main conduit 10 which communicates by a branch connection with a penstock conduit 12 of smaller diameter. Both conduits are in subterranean tunnels and are subjected to a hydraulic head in excess of five hundred feet, the diameter of the tunnel 14 or main conduit in this case being thirty-seven feet and the diameter of the tunnel 15 for the penstock conduit being eighteen feet.

The main conduit is preferably constructed of heavy curved steel plates which may be welded together both circumferentially and longitudinally. At the juncture of adjacent sections a circumferential fillet 16 is a part of the conduit. Welded thereto is a circumferential flange member 18 preferably spaced from and supported by the walls of the tunnel by an annulus 20. Fig. 1 shows such an annulus on either side of the lateral penstock tunnel 15.

The branch connection section 22 of the main conduit is preferably joined with adjacent sections by butt-straps 24. Secondary reinforcing bands 66 are spaced from the bands 24. At one side, the main conduit is provided with a ring 28 which forms a lateral outlet to be connected to the penstock section 12.

Experiments have shown that there are important manufacturing and operative advantages which result from the present conduit construction wherein there is a warped surface connecting the single diameter main conduit and the single diameter branch conduit in which warped surface there is a concentration of pressure produced forces on lines on opposite sides of the main conduit and parallel to its longitudinal axis and on lines substantially parallel to the axis of the branch.

The present conduit branch will now be described with reference to Fig. 6, at the upper part of which there is indicated at 30 the line and position of the ring 28. This illustrates the position and diameter of the connection of the branch or penstock conduit which is preferably cylindrical and of a single diameter. Line 32 indicates a plane normal to the longitudinal axis of the main conduit which is also preferably cylindrical and of a single diameter. The single diameter branch at position 30 is connected to the single diameter main conduit at the position 32 by a junction section of warped surfaces and of multiple curvature as outlined by the areas indicated by the groups of letters A, B, C, D, E and B, F, G, H, C indicated in Fig. 6. The above described warped surface is non-cylindrical and there is not a straight line or flat area in it, (with the exception of boundary positions). Furthermore, this warped surface junction section is subjected to fluid pressures of high order.

In illustrating the development of the warped surface junction section between the main conduit and the branch conduit a number of planes may be considered as radiating from the positions indicated by the numerals 34 and 36. These planes are illustrated for the purpose of clearly describing the two parts of the warped surface junction member. Each part is characterized by curved intersections of the planes radiating from a common line coinciding with one of the lines 34 and 36. This line includes the intersection of a plane normal to the longitudinal axis of the branch with another plane normal to the longitudinal axis of the main conduit. In other words, the plane at 30 and the plane at 38 (considering them normal to their respective branches) intersect at a line coinciding with the line 34 and including the intersections of all of the intermediate planes radiating from 34.

In the construction shown in Fig. 6, where the planes aforesaid intersect, the arcs of circles are determined by three points, two of which are fixed by the ends of lines F—F, 9—9, etc., joining corresponding points on the lines AF on opposite sides of the conduit. The third point is determined by the intersection of the various planes with the line GH. It is obvious from Fig. 6 that the points determined by the various planes 36—F to 36—B and line GH recede from the lines 9—9, 8—8, 7—7 and B—B. In consequence, the radii of the circles determined by these three points grow smaller from position 36—F to position 36—B, though the size of the segments included by the warped surface increases in that order. The radii of these arcs of circles decrease from 36—F to 36—B, but at the same time the size of the warped surface increases. The segments included by the warped surface increase in size from 32 to 40 because the points on line HG recede from the chords 9—9, 8—8, etc., and thus more of the circle arc is included in the warped surface. However, the radii of the arcs grow smaller in the same order because the distance between the points on line HG and the chords fixed by the lines AF from 32 to 40 increases.

It is to be understood that the above description of planes radiating from a line at 34 is illustrative, and that a similar description applies to planes radiating from a common intersection line at 36.

The above described warped surface junction member or section intersects the main conduit in a straight line element AF on each side of that conduit. This intersection is illustrated by the line 42 in Fig. 7, and it is along this line that there may be attached to the section 22 the beam or stiffening member 44. It is preferably welded to the metal of the section 22 at this position and its end portions are of gradually decreasing width as indicated at 46. This formation of the beam 44 is for the purpose of eliminating a sudden change in the radial expansion or radial flexibility capacity in the main conduit near the ends of beam 44 and the adjacent bands 24.

The two sets of planes described as radiating from the lines 34 and 36 have intersections with the parts of the warped surface juncture which may, for convenience, be designated in Fig. 6 as 1, 2, 3, 4, B, and to the right and left of B as 7, 8, 9, F and 7', 8', 9', A, respectively. These planes, where they intersect the warped surface juncture produce sections of the shape shown in the accompanying Figs. 6ᵃ, 6ᶜ, 6ᶠ, and 6ⁱ, the letter and figure designations thereon corresponding to the reference characters used on Fig. 6. Along the surface indicated by an element B, C thereof, and at opposite locations there may be provided external reinforcing beams 48.

The warped surface junction section joins the single diameter cylindrical main conduit 10 with the single diameter cylindrical branch conduit 12 and intersects the former along two straight line elements AF on opposite sides of the connection between the two conduits and there may be a reinforcing member 44 along each of said lines. These reinforcing members 44 may be termed the main pressure beams and the reinforcing members 48 may be considered secondary beams. They act in conjunction with the curved beams or truss members 50 to take care of all unbalanced forces which are not pure tension forces. Figs. 3, 4 and 5 of the drawings clearly show the arrangement of these members in detail. They are arcuate in shape and are preferably rigidly connected at their ends to the main pressure beams 44 as shown. They are indicated in Fig. 1 as diverging and passing around the two crotch positions of the branch outlet. The positions at which the truss members are secured to the main pressure beams 44 are such that there will be a minimum tendency for the beams to bend. Furthermore, the truss members are spaced, at positions intermediate their ends, from the adjacent conduit walls.

The truss members or curved beams 50 are illustrated in Figs. 3, 4 and 5 as supported upon pedestals 52 and 54 located at opposite sides of the tunnel 15. Preferably, each pedestal carries a plurality of coiled springs 56 which are surrounded by telescoping casing sections 58 and 60 so that the springs may be immersed in oil. Resting upon the springs are metallic footings 62 preferably rigid with and welded to the members 50. This manner of supporting the truss members or C-bars 50 gives them increased flexibility and avoids the transmission to the conduit of their dead weight.

The outlet section of the main conduit between the circumferential rib 28 and the beams 44 may be constructed of plates which are shaped in such a manner as to center all forces other than the direct tension stresses in the plates due to internal pressure, on the lines of the beams 44 and 48. The branch connection may be made as a stream lined T-branch with the plates on opposite sides of the beams 48 identical in construction. A structure approaching this arrangement is indicated in Fig. 7. Such a system, including the above indicated beam arrangement and plate contour, eliminates many stress factors by virtue of its greater flexibility, and facilitates economical manufacture by eliminating excessively oblique and irregular welds.

Referring back to Fig. 1 of the drawings it may be stated that the annuli 20 are of concrete, and that they are placed in position after the metallic conduit is completed within the tunnel. They serve to maintain the metallic conduit in operative position.

Although the main conduit 10 has a number of sections made up of welded plates the adjoining sections are not united entirely by welding. The circular butt-straps may be welded along one annular edge portion to a section before it is placed in the tunnel. The joining section, constructed to have an end tightly fitting within the remainder of the butt-strap may be inserted therein and secured thereto by some means such as rivets placed at positions indicated by the centerlines 64.

Adjacent to butt-straps 24 there are secondary straps 66, preferably of a cross-section much less than that of the butt-straps. These secondary straps may be made of bar material of square cross section as shown. They are placed in the position shown for the purpose of preventing any sharp changes in the expansibility of the conduit at positions near the adjacent edges of the butt-straps.

The truss members or curved beams 50 are preferably constructed as castings having two arcuate ribs 68 and 70, but it is understood that the applicant does not limit himself to this particular manner of manufacture or to this particular material.

As indicated in Fig. 8 of the drawings the ends of the stiffeners or main pressure beams 44 are reduced in width to an amount about equal to the thickness of the butt-straps 24. These ends preferably contact with the butt-straps and are welded thereto as is indicated in Fig. 8.

While the invention has been described with reference to the particular elements illustrated in the drawings, it is to be appreciated that it is not limited thereto, but that it is of a scope commensurate with the scope of the sub-joined claims.

What is claimed is:

1. In a branch connection for the large diameter metallic conduits for a high pressure hydraulic system, a cylindrical main conduit of single diameter and constructed of forged sheet metal sections welded together, a cylindrical branch conduit of smaller diameter and similar construction extending transversely of the main conduit, a non-cylindrical metallic warped surface junction section of similar construction joining the two conduits and having two parts the surface of each of which includes the circular intersections of a series of planes radiating from a common line which includes the intersection of a plane normal to the longitudinal axis of the branch with a plane normal to the longitudinal axis of the main conduit, the warped surface junction section intersecting the main conduit in straight line elements on opposite sides of said conduit, metallic main pressure beams bearing on the main conduit along said straight line elements, and truss members externally of said conduits for rigidly bonding said pressure beams.

2. In branch connections for large diameter metallic fluid pressure conduits, a cylindrical main conduit section of single diameter, a cylindrical branch conduit, a warped surface junction section connecting the conduits, load concentrating beams on opposite sides of the junction section and rigid with said section, said beams extending parallel to the axis of the main conduit, and means rigid with such beams and passing exteriorly of said section around the outlet to offset the discontinuity of pressure circles of the main conduit at the position of the juncture with the branch.

3. In combination a main conduit cylindrical in cross section, a cylindrical branch conduit, a warped surface junction section joining the conduits, and arched beam members passing around the branch and rigid with the main conduit at their ends only, the portions of the beam members between their ends being spaced from the walls of the conduit.

4. In combination, a main conduit cylindrical in cross section, a cylindrical branch conduit, a warped surface section connecting the conduits, curved beam members arched around the conduits and said section and rigidly secured only at their ends to the main conduit, the beam members diverging from each other at their positions of securement to the main conduit and extending through the crotch formed by the junction of the main conduit and the outlet in such a way as to be spaced from both the walls of the conduit and the outlet at all positions intermediate their ends, and means for resiliently supporting the curved beam members intermediate their ends so that their weight is not imposed upon the conduit construction.

5. In a metallic branch connection for high pressure fluid conduits, a main conduit of single curvature in cross section, a branch conduit of a single curvature in cross section, a warped surface metallic junction section joining the two conduits, said junction section intersecting the main conduit along two straight line elements of the main conduit, and main external pressure beams welded to the main conduit and extending along said straight line elements.

6. In a branch connection for a large diameter metallic conduit system subjected to high fluid pressures, a single diameter cylindrical main conduit characterized by relatively high flexibility and constructed of forged sheet metal sections welded together, a single diameter branch conduit of similar construction and having small ratio of wall thickness to inside diameter, a metallic warped surface junction section of similar construction joining the two single diameter conduits, and a plurality of arcuate external truss members extending around said junction section and having their ends rigid with the main conduit at its juncture with the branch.

7. In a metallic branch connection, a main conduit of single curvature, a branch conduit of single curvature, a warped surface junction section joining said conduits and having two surfaces each of which includes an infinite number of circular intersections of a series of radial planes from a common line which includes the intersection of planes normal to the branch and the main conduit, the two surfaces of the junction section intersecting on lines on opposite sides of the branch and extending substantially along a plane passing through the longitudinal axis of the branch while the entire junction section intersects the main conduit along two straight line elements of the latter, main and secondary pressure beams along said last named intersection lines, and arcuate truss members extending around the junction section and having their ends rigid with the main pressure beams.

8. A pressure fitting comprising a tubular body having a wall surface generated by moving a straight element about an axis and with a branch opening interrupting the continuity of the wall of said body whereby the hoop strength is materially lessened, and means restoring the hoop strength including stiffening members disposed along elements of the tubular body at opposite sides of said opening with means transferring to said stiffening members, upon a differential in pressure between the interior and exterior of the body, forces which would otherwise change the configuration of the body.

9. A pressure fitting comprising a tubular body having a wall surface generated by moving a straight element about an axis and with a branch opening interrupting the continuity of the wall of said body whereby the hoop strength is materially lessened, and means restoring the hoop strength including stiffening members disposed along elements of the tubular body at opposite sides of said opening and within the half of said body containing said opening and with means transferring to said stiffening members, upon a differential in pressure between the interior and exterior of the body, forces which would otherwise change the configuration of the body.

10. In a branch connection, a tubular body portion and an integral branching portion, the whole assembled from flat plates cut, formed and then united in edge to edge relation as by welding, and beam members reenforcing the body portion along elements parallel to the axis of the body portion on opposite sides of the branching portion to compensate for hoop strength lost by intersection of the branching portion.

11. A transition member having connecting conduits in branching relation which comprises, a main portion of arcuate cross-section, and an outlet carrying portion adapted to be joined with the main portion along lines determined by a plane parallel to the axis of the main portion, and cross-sections of which outlet carrying portion are arcs of circles in planes radiating from lines produced by intersecting planes normal to the axis of the main portion and the plane of the outlet.

12. In a pipe branch structure having main and branch conduit portions intersecting along lines extending longitudinally of the main portion, said main and branch portions each comprising a group of arcuate elements terminating at said lines of intersection, said branch portion including arcuate elements oppositely arranged in groups and terminating at lines extending longitudinally of the branch portion, means for preventing deformation of said structure including reinforcing members rigid with said structure along said lines of intersection, a supporting ring surrounding said branch portion, and other reinforcing members rigid with said branch portion along the lines at which said oppositely arranged elements terminate, said last named reinforcing members being connected at their ends to said first named reinforcing members and to said ring.

13. In a pipe branch structure, intersecting main and branch conduit portions each having walls formed throughout of arcuate elements in successive planes, said main portion having arcuate elements in parallel planes transverse to the main axis and said branch portion having arcuate elements in planes converging exteriorly of the structure, some elements of said branch portion being connected to arcuate elements of said main portion along lines extending longitudinally of the main axis while other branch elements are interconnected along lines extending longitudinally of the branch axis, and means for reinforcing said structure against forces which would otherwise cause deformation including means supporting opposite wall portions at least along lines along which arcuate elements of said branch portion are connected to arcuate elements of said main portion.

CECIL H. GAY.